United States Patent Office 2,885,410
Patented May 5, 1959

2,885,410

PRODUCTION OF VAT DYESTUFFS

Rütger Neeff and Heinz Werner Schwechten, Leverkusen-Bayerwerk, Germany, assignors to Farbenfabriken Bayer Aktiengesellschaft, Leverkusen, Germany, a corporation of Germany No Drawing. Application May 27, 1954
Serial No. 432,915

Claims priority, application Germany May 29, 1953

7 Claims. (Cl. 260—368)

This invention relates to new vat dyestuffs and to methods for preparing the same.

In German Patent 343,252 there is described a dark red vat dyestuff having the following formula:

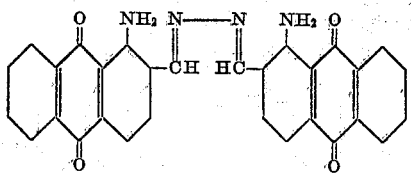

This dyestuff has unsatisfactory fastness properties.

We have now found that nuclearly substituted derivatives of the above anthraquinone dyestuff exhibit excellent fastness to light and washing.

The novel dyestuffs of this invention may be obtained by treating nuclearly substituted derivatives of 1-amino-2-methyl-anthraquinone with nitrobenzene in the presence of alkali to form the corresponding azomethines and reacting the latter with hydrazine to form the corresponding azines.

Nuclearly substituted derivatives of 1-amino-2-methyl-anthraquinone which are useful in the invention include the halogen-substitution products, such as 6-chloro-, 7-chloro-, 6.7-dichloro- and 6(7)-chloro-1-amino-2-methyl-anthraquinone, the 6- and 7-alkyl- and arylsulfones, and the 6- and 7-sulfonamido derivatives. 4-acylamino- and 5-acylamino-1-amino-2-methyl-anthraquinones have also proven to be suitable starting materials for preparing the dyestuffs of the invention.

Alternatively, 1 mol of 1.4- or 1.5-diamino-anthraquinone-2-aldehyde may be reacted with ½ mol of hydrazine and the reaction product acylated with suitable acid halides. Thus, the same dyestuffs are obtained as in the reaction of hydrazine with the azomethines formed by oxidation of 4-acylamino- or 5-acylamino-1-amino-2-methyl-anthraquinone with nitrobenzene.

Another method for preparing the novel dyestuffs of this invention comprises reacting nuclearly substituted 1-amino-anthraquinone-2-aldehydes or the 1.2-anthraquinone-3-isoxazoles obtainable therefrom with hydrazine.

It is of course possible to use a mixture of two differently substituted azomethines and aldehydes, respectively, in the reaction with hydrazine. In this case asymmetric azines are formed.

The invention is further illustrated, but not limited, by the folowing examples in which all parts are by weight:

Example 1

20 parts of 6-chloro-1-amino-2-methyl-anthraquinone, 10 parts of potassium carbonate, 4 parts of aniline, and 120 parts of nitrobenzene are refluxed for 6 hours. The reaction mixture is filtered with suction at 170° C. The phenyl-azomethines of 6-chloro-1-amino-anthraquinone-2-aldehyde crystallizes from the filtrate on cooling in the form of blue-red prismatic needles which are filtered off with suction and freed of nitrobenzene in the usual manner. The azomethines dissolve in concentrated sulfuric acid to give an olive-colored solution. When adding paraformaldehyde in the cold a gray-blue solution is obtained which becomes green on heating.

50 parts of the azomethines and 14.5 parts of a 22.9% aqueous solution of hydrazine hydrate are refluxed for 2 hours in 1500 parts of glacial acetic acid. The conversion of the blue-red prism of the azomethines into the needles of the azine is followed microscopically. When the reaction is complete the precipitate is filtered off with suction and washed with some glacial acetic acid. The azine which has the formula

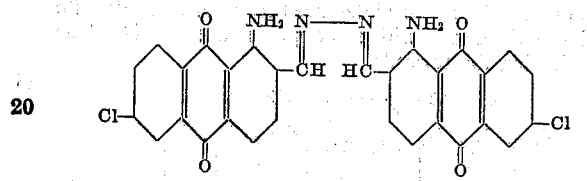

dissolves in concentrated sulfuric acid to give an olive-colored solution. However, when paraformaldehyde is added in the cold a blue-green solution is obtained which gets blue on heating. Cotton is dyed from a red-blue vat in strong red-violet shades. The fastness to light of the dyeings is much greater than those obtained with the azine described in German Patent 343,252.

The same dye may be obtained by reacting 6-chloro-1-amino-anthraquinone-2-aldehyde or 6-chloro-anthraquinone-1.2-isoxazole with hydrazine hydrate.

Example 2

50 parts of 1-amino-2-methyl-4-benzoylamino-anthraquinone, 25 parts of potassium carbonate, and 10 parts of aniline are refluxed in 300 parts of nitrobenzene until a sample dissolves in pyridine with a clear blue color. The reaction mixture is filtered while hot. On cooling the phenyl-azomethines of 1-amino-4-benzoylamino-anthraquinone-2-aldehyde crystallizes from the filtrate in beautiful dark blue prisms. The crystals dissolve in concentrated sulfuric acid to give a greenish-yellow solution. On addition of paraformaldehyde in the cold the color changes to blue-green. On heating the color changes from blue-green to a dull violet.

9 parts of the phenyl-azomethines thus obtained are mixed with 2.2 parts of a 22.9% aqueous solution of hydrazine hydrate and 300 parts of glacial acetic acid and the solution is refluxed for 4 hours. The dark blue prisms of the azomethines are hereby converted into greenish-blue needles of the azine. This conversion may be followed microscopically. The azine having the formula

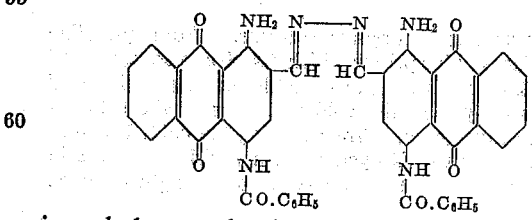

is worked up as described in Example 1. Its reaction with sulfuric acid and formaldehyde is similar to that of the azomethines. The azine is poorly soluble in high-boiling organic solvents. Cotton is dyed from a bluish-violet vat in greenish-blue shades. The dyeings exhibit excellent fastness to light and to chlorine.

In an analogous manner dyes from 4-(p-chlorobenzoyl)-amino- and 4-(p-methoxybenzoyl)-amino-1-amino-2-methyl-anthraquinone may be obtained. The shades of these dyes are more greenish than that of the above azine which is not substituted in the benzoyl group.

*Example 3*

40 parts of 1-amino-2-methyl-5-benzoylamino-anthraquinone, 20 parts of potassium carbonate, and 8 parts of aniline are refluxed for 1½–2 hours into 240 parts of nitrobenzene. The reaction mixture is filtered off by suction at 170° C. The prismatic needles of the phenyl-azomethines of 1-amino-5-benzoylamino-anthraquinone-2-aldehyde which crystallize on cooling are recovered in the usual manner. The color of the solution of the product in concentrated sulfuric acid is yellow. The reaction with formaldehyde gives a blue color in the cold and a green color when heated.

55 parts of the azomethines and 3 parts of hydrazine hydrate are refluxed for 4 hours in 1600 parts of glacial acetic acid. On cooling the azine, which crystallizes from the boiling mixture in violet needles, is filtered off with suction and washed with some glacial acetic acid. The azine having the formula

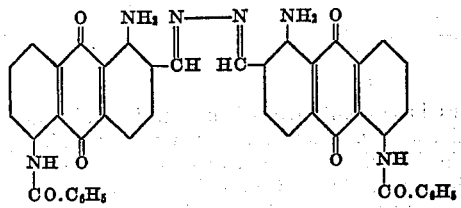

dyes cotton in very full red-violet shades.

*Example 4*

10 parts of 1.4-diamino-anthraquinone-2-aldehyde and 3.2 parts of a 22.9% aqueous solution of hydrazine hydrate are refluxed for 2 hours in 350 parts of glacial acetic acid. The azine crystallizing in gray-blue needles is filtered off with suction, washed with glacial acetic acid, and dried.

7.2 parts of the azine in 60 parts of nitrobenzene are acylated by adding dropwise 5.9 parts of m-trifluormethyl-benzoyl chloride at 95° C. A product is obtained which crystallizes in blue needles and may be isolated in the usual manner. The dyestuff which has the formula

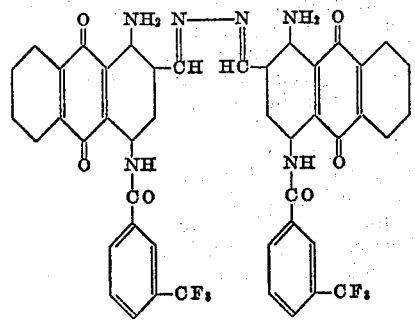

is poorly soluble in organic solvents. From quinoline it crystallizes in blue prisms which dissolve in concentrated sulfuric acid to give a green solution. On addition of paraformaldehyde in the cold the color of the solution changes to blue-green. When heating the color becomes dull violet. Cotton is dyed from a bluish-violet vat in full blue shades of extraordinary wash and light fastness.

*Example 5*

3 parts of 1-amino-5-benzoylamino-anthraquinone-2-aldehyde-phenyl-azomethines, 3 parts of 1-amino-4-benzoylamino-anthraquinone - 2 - aldehyde - phenyl - azomethines and 1.44 parts of a 22.9% aqueous solution of hydrazine hydrate are refluxed in 180 parts of glacial acetic acid until unchanged azomethines can no longer be detected. The azine of the formula

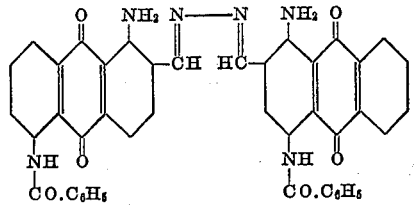

is isolated in the usual way. It dissolves in concentrated sulfuric acid with a greenish-yellow color which on addition of paraformaldehyde changes to green in the cold and to a dull green when heated. Cotton is dyed from a bluish-violet vat in strong blue-gray shades.

*Example 6*

47.5 parts of 1-amino-4-p-methoxy-benzoylamino-anthraquinone-2-aldehyde-phenyl-azomethines, 32.6 parts of 6 - chloro - 1 - amino - anthraquinone - 2 - aldehyde-phenyl-azomethines and 21.5 parts of a 22.9% aqueous solution of hydrazine hydrate are refluxed for several hours in 3000 parts of glacial acetic acid. The product is filtered off with suction and freed of glacial acetic acid. The dyestuff of the formula

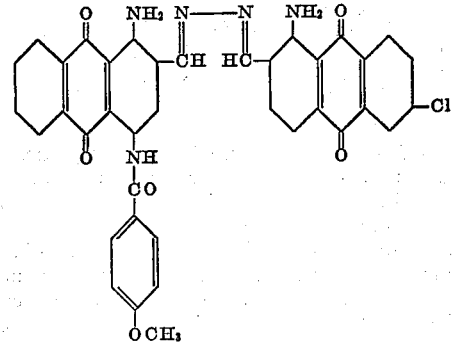

dissolves in concentrated sulfuric acid with a brownish-yellow color which on addition of paraformaldehyde changes to greenish-blue in the cold and to a dull violet-blue when heated. Cotton is dyed from a violet vat in reddish-gray shades.

*Example 7*

102.5 parts of the phenyl-azomethines of 1-amino-4-benzoylamino-anthraquinone-2-aldehyde and 32 parts of the phenyl-azomethines of 1-amino-anthraquinone-2-aldehyde are refluxed for 2 hours with 8.2 parts of hydrazine hydrate in 1350 parts of glacial acetic acid. The product, which crystallizes in marine-blue needles, is a mixture of the following two compounds:

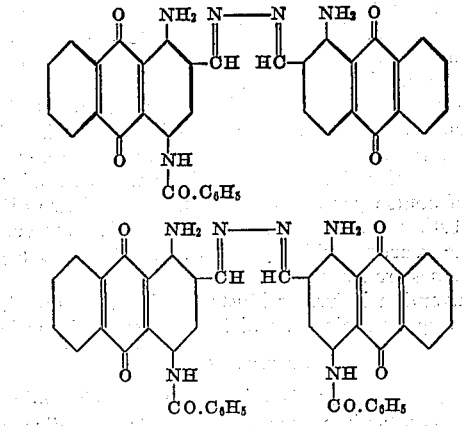

The product is filtered off with suction and freed of the solvent. The dyestuff dyes cotton from a blue vat in strong marine-blue shades having excellent fastness properties.

We claim:
1. As anthraquinone dyestuffs, derivatives of

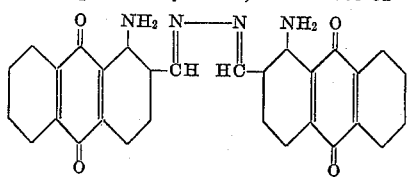

which are members selected from the group consisting of anthraquinone dyestuffs nuclearly substituted in both anthraquinone radicals with chlorine and an anthraquinone dyestuff nuclearly substituted in one anthraquinone radical with a member of the group consisting of benzoyl amino radicals substituted with a member selected from the group consisting of chlorine, alkoxyl, and trifluor methyl groups and anthraquinone dyestuffs nuclearly substituted in both anthraquinone radicals with a member of the group consisting of benzoyl amino radicals and benzoyl amino radicals substituted with a member selected from the group consisting of chlorine, alkoxyl, and trifluor methyl groups.

2. The anthraquinone dyestuff having the following formula:

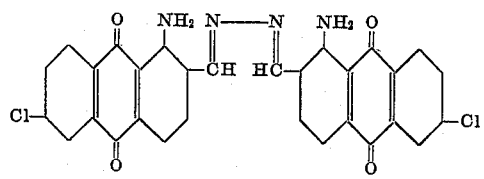

3. The anthraquinone dyestuff having the following formula:

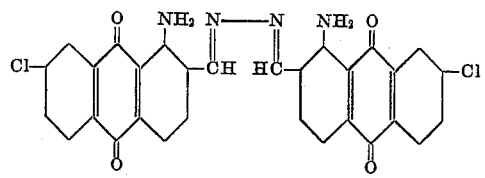

4. The anthraquinone dyestuff having the following formula:

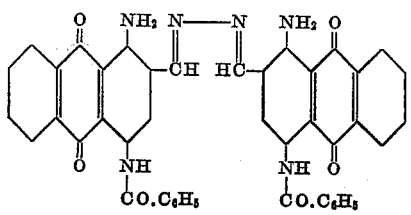

5. The anthraquinone dyestuff having the following formula:

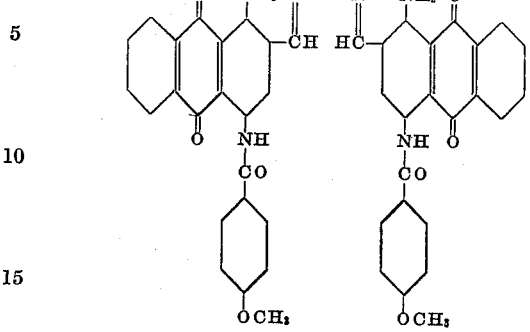

6. The anthraquinone dyestuff having the following formula:

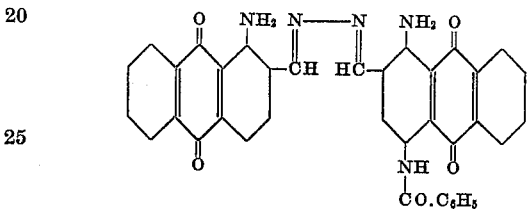

7. The anthraquinone dyestuff having the following formula:

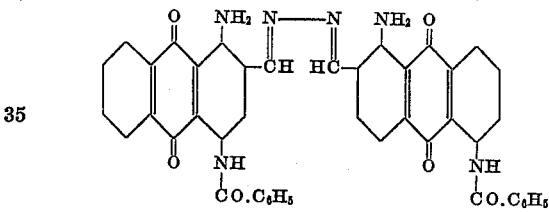

References Cited in the file of this patent
UNITED STATES PATENTS

| | | |
|---|---|---|
| 1,285,727 | Kalischer | Nov. 26, 1918 |
| 1,881,697 | Kunz | Oct. 11, 1932 |
| 2,230,574 | Mieg et al. | Feb. 4, 1941 |

FOREIGN PATENTS

| | | |
|---|---|---|
| 642,592 | Great Britain | Sept. 6, 1950 |

OTHER REFERENCES
Georgievics: Dye Chemistry, 1920, page 255.